June 2, 1936.  H. A. MULLETT  2,042,547
COMPARTMENT SHOWER
Filed Aug. 27, 1934   2 Sheets-Sheet 1

INVENTOR
Howard A. Mullett
BY
Quarles & French
ATTORNEYS

June 2, 1936. H. A. MULLETT 2,042,547
COMPARTMENT SHOWER
Filed Aug. 27, 1934 2 Sheets-Sheet 2
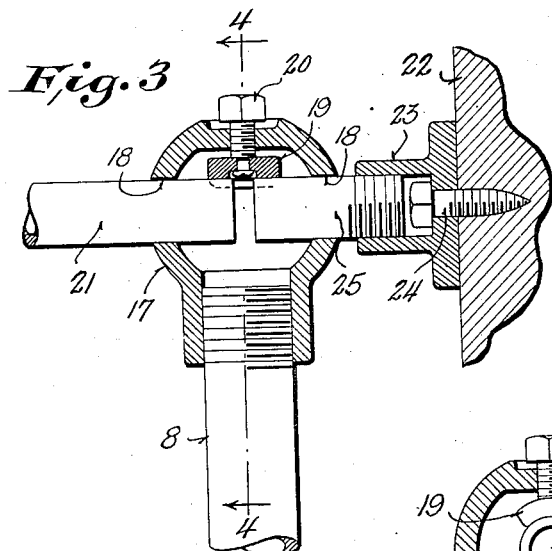
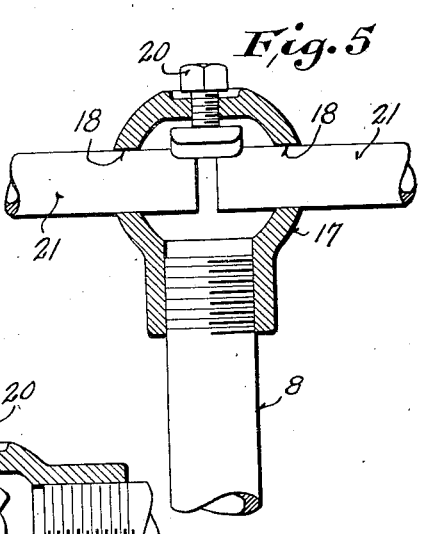
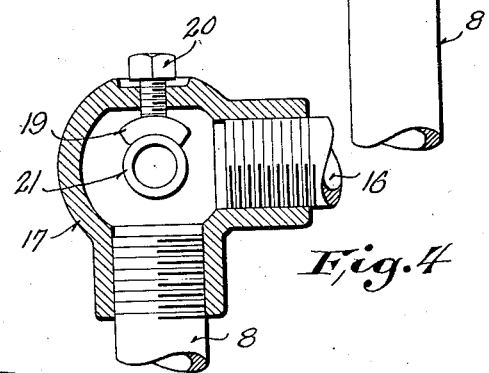
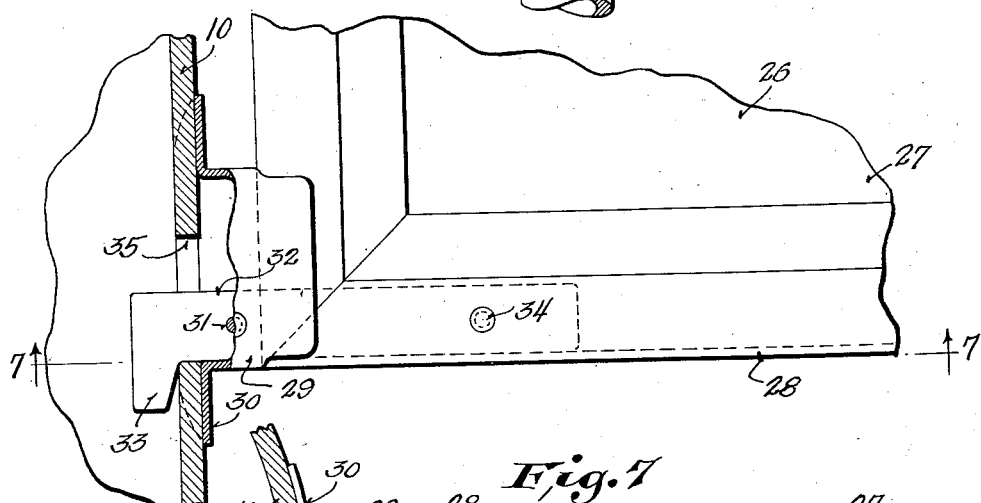
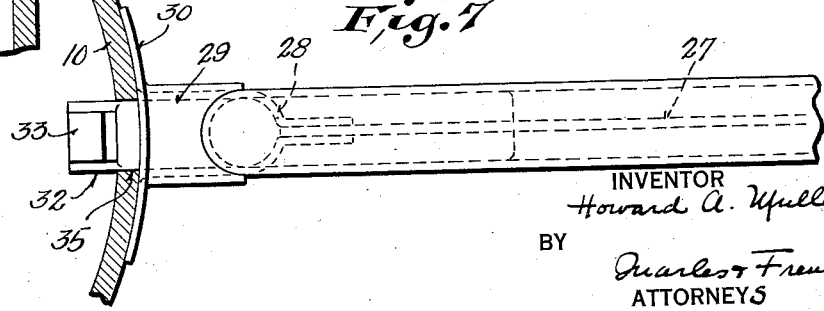
INVENTOR
Howard A. Mullett
BY
Quarles & French
ATTORNEYS Patented June 2, 1936

2,042,547

UNITED STATES PATENT OFFICE 2,042,547

COMPARTMENT SHOWER

Howard A. Mullett, Milwaukee, Wis., assignor to Bradley Washfountain Company, Milwaukee, Wis., a corporation of Wisconsin Application August 27, 1934, Serial No. 741,642

5 Claims. (Cl. 4—146)

This invention relates to new and useful improvements in compartment shower baths.

One of the objects of the invention is to provide a compartment shower in which the compartments are arranged in the form of a semicircle with one set of supply pipes and one drain for a three compartment shower.

A further object of the invention is to provide a simple arrangement whereby the hot and cold water supplies may be led in at the top.

A further object of the invention is to provide simple and novel connections for the partitions.

A further object is to provide a new and improved partition supporting frame.

A further object is to simplify and improve upon the structures of prior U. S. Patents No. 1,747,838 of February 18, 1930, and No. 1,821,229 of September 1, 1931, to Mullett and Heine.

The invention further consists in the several features hereinafter set forth and more particularly defined by claims at the conclusion hereof.

In the drawings:

Fig. 3 is a detail sectional view taken on the line 3—3 of Fig. 2;

Fig. 4 is a detail sectional view taken on the line 4—4 of Fig. 3;

Fig. 5 is a detail sectional view taken along the line 5—5 of Fig. 2;

Fig. 6 is an enlarged view, partly in section showing the connection between one of the panels and the central standard;

Fig. 7 is a sectional view taken on the line 7—7 of Fig. 6.

Figure 1:
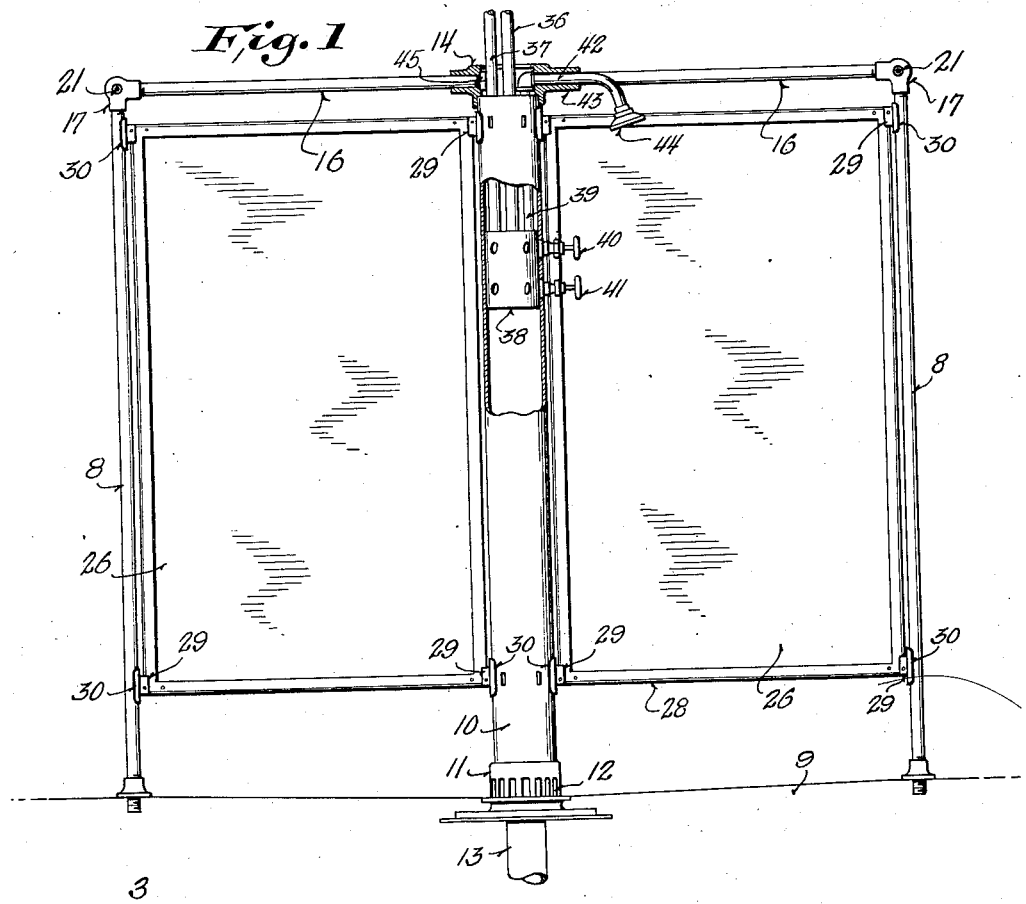
Fig. 1 is a detail sectional view taken generally along the line 1—1 of Fig. 2.

Referring to the drawings, it will be noted that the apparatus includes a tubular framework formed in part by four upright tubes 8 arranged on the arc of a circle and each anchored in a base 9, such as a dished slab of concrete. A central hollow standard 10 is also anchored in said base or slab and includes a fitting 11 having drainage openings 12 therein communicating with a drain pipe 13.

The standard 10 has a top fitting 14 secured thereto provided with radially disposed tubular projections 15 receiving one of the threaded ends of radially disposed brace tubes 16 whose other threaded ends are connected with an elbow fitting 17 that is secured to the top of each of the tubes 8. The inner ends of brace tubes 16 extend through projections 15, which are not threaded, into the interior of fitting 14 and are held in place by nuts 45 which place the tubes 16 under tension and hold the panels 26 under compression.

Each of the fittings 17 also has horizontally disposed alined openings 18 and, as shown in Figs. 3 to 5, a clamping plate 19 operatively connected with a clamping bolt 20 cooperates with said openings in securing the ends of tubes to said fitting. Thus arcuate tubes 21 are disposed between adjacent upright tubes 8 and adjacent tubes 21 are secured at their ends within the fitting 17 by the plate 19 and its bolt 20.

Figure 2:
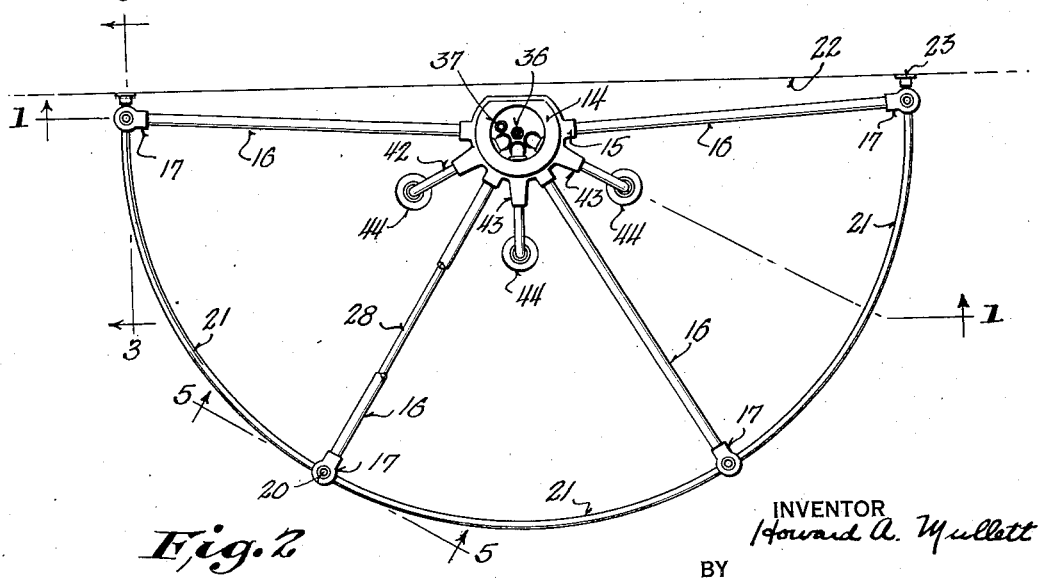
Fig. 2 is a detail plan view of apparatus embodying the invention, parts being broken away.

The structure is designed to be placed adjacent the wall along its diametrical side, and to firmly hold it in position the upper part of the framework is connected to the side wall 22, as shown more particularly in Figs. 2 and 3, by a flange fitting 23 secured to the wall by a lag screw 24 and to the framework by a tube 25 connecting it with the adjacent elbow fitting.

The above described framework forms a support for the partitions 26 and the curtains (not shown) but adapted to be hung from the tubes 21.

Each of the partitions 26 comprises a panel 27 of suitable material having tubular metal edging 28 secured thereto. At each corner, the panel is provided with a tube engaging fitting 29. At one side the curved pad portions or faces 30 of these fittings abut against the standard 10 and at the other side similar faces of similar fittings abut against the post or tube 8. The fittings 29 adjacent the standard 10 are secured to the partition by riveting them at 31 to the shanks 32 of hooks 33, said shanks being secured by rivets 34 to the panel edging 28. The fittings 29 adjacent the tubes 8 are secured to the panel by riveting to metal bars which are similar to the shanks of said hooks 33. The hooks 33 engage in vertically disposed slots 35 in the standard 10.

A hot water pipe 36 and a cold water pipe 37 lead vertically downward and connect with a mixing fitting 38 similar to that of the prior U. S. Patent No. 1,747,838 and from which the flow of tempered water to the discharge pipe 39 is controlled by the valves 40 and 41. The pipe 39 has a section 42 leading through a tubular guide 43 on the top fitting 14 and extending into a compartment and provided with a shower or spray head 44. Thus by properly regulating the valves 40 and 41 the temperature of the water delivered through the spray head 44 may be controlled to suit the desires of the bather.

With the above arrangement three shower compartments of good size are obtained and the panels are firmly secured in position.

The construction of this invention above described may be installed in existing buildings with great economy. The usual practice in buildings of the industrial type or equivalent is to carry all plumbing exposed and near the ceiling. Supply connections for the construction of this invention can be made without alteration of the building construction. The handling of waste is accomplished directly and simply. The arrangement and disposition of the parts provides a maximum accommodation with a given amount of material employed in the construction. A very serviceable and substantial structure is provided.

It is to be understood that this invention is not to be limited to any particular form or arrangement of parts except in so far as such limitations are included in the claims.

What I claim as my invention is:

1. In a shower bath apparatus, the combination with a base and a wall, of a framework including uprights mounted in said base and tubing arranged in a semicircle, means for anchoring said framework at its ends to said wall, a standard adjacent said wall and at the center of said semicircular framework, partitions radiating from said standard and connected to said framework and forming a plurality of compartments, there being a partition adjacent the wall on each side of said standard, a spray pipe extending into each compartment, and means within each compartment and associated with said standard for controlling the delivery of tempered water to its spray pipe.

2. In a shower bath apparatus, the combination with a base and a wall, of a framework including uprights mounted in said base and tubing arranged in a semicircle, a standard adjacent said wall and at the center of said semicircular framework, partitions adjacent said wall and intermediate the ends of said framework and radiating from said standard to form a central and end compartments, a spray pipe extending into each compartment, and means within each compartment and associated with said standard for controlling the delivery of tempered water to its spray pipe.

3. In a shower bath apparatus, the combination of a central tubular standard, tubular uprights radially arranged relative to said standard, partitions between said standard and said uprights forming a plurality of compartments, fittings on said partitions having curved pad portions engaging said standard and said uprights, hooks on said partitions engaging parts of said standard adjacent the fittings engaging said standard, and means for delivering a shower spray to each of said compartments.

4. In a shower bath apparatus, the combination of a central tubular standard, tubular uprights radially arranged relative to said standard, an elbow fitting mounted on each upright, a radially disposed tube connecting said fitting with said standard, arcuate tubes extending between said fittings, means for simultaneously clamping the ends of adjacent tubes to their fittings, means for anchoring the end fitting to a wall, partitions extending between said standard and said uprights and forming a plurality of compartments, and means for delivering a shower spray to each of said compartments.

5. In a shower bath apparatus, the combination of a central standard, uprights radially arranged relative to said standard, an elbow fitting mounted on each upright, a radially disposed brace member connecting said fitting with said standard, arcuate tubes extending between said fittings and extending from the end fittings, means for simultaneously clamping the ends of adjacent tubes to their fittings, means for anchoring those tubes extending from the end fittings to a wall, partitions extending between said standard and said uprights and forming a plurality of compartments, and means for delivering a shower spray to each of said compartments.

HOWARD A. MULLETT.